United States Patent
Alvarez et al.

(10) Patent No.: US 7,418,003 B1
(45) Date of Patent: Aug. 26, 2008

(54) PIM SPARSE MODE TO SOURCE SPECIFIC MULTICAST CONVERSION

(75) Inventors: Daniel Alvarez, Pleasanton, CA (US); Arjen Boers, Sitges (ES); Toerless Eckert, Mountain View, CA (US); Ijsbrand Wijnands, Leuvan (BE)

(73) Assignee: Cisco Systems, Inc., San Jose, CA (US)

( * ) Notice: Subject to any disclaimer, the term of this patent is extended or adjusted under 35 U.S.C. 154(b) by 775 days.

(21) Appl. No.: 10/777,601

(22) Filed: Feb. 12, 2004

(51) Int. Cl.
*H04J 3/26* (2006.01)

(52) U.S. Cl. .................. 370/432; 370/466; 370/400

(58) Field of Classification Search ............ None
See application file for complete search history.

(56) References Cited

U.S. PATENT DOCUMENTS

| | | | | |
|---|---|---|---|---|
| 5,959,989 | A | 9/1999 | Gleeson et al. | 370/392 |
| 6,182,147 | B1 | 1/2001 | Farinacci | 709/238 |
| 6,331,983 | B1* | 12/2001 | Haggerty et al. | 370/400 |
| 6,597,703 | B1* | 7/2003 | Li et al. | 370/428 |
| 6,631,420 | B1 | 10/2003 | Li et al. | 709/242 |
| 6,633,765 | B1 | 10/2003 | Maggenti | 455/503 |
| 6,711,172 | B1 | 3/2004 | Li | 370/401 |
| 6,853,639 | B1* | 2/2005 | Watanuki et al. | 370/390 |
| 6,963,573 | B1 | 11/2005 | Cain et al. | 370/401 |
| 6,970,461 | B2 | 11/2005 | Unitt et al. | 370/390 |
| 6,988,146 | B1 | 1/2006 | Magret et al. | 709/238 |
| 7,061,880 | B2 | 6/2006 | Basilier | 370/312 |
| 7,233,987 | B2* | 6/2007 | Watkinson | 709/223 |
| 2004/0100983 | A1* | 5/2004 | Suzuki | 370/432 |
| 2004/0122890 | A1* | 6/2004 | Watkinson | 709/203 |
| 2005/0076207 | A1* | 4/2005 | Park et al. | 713/163 |

FOREIGN PATENT DOCUMENTS

| WO | WO 00/51370 A1 | 8/2000 |
|---|---|---|
| WO | WO 02/45334 A1 | 6/2002 |

OTHER PUBLICATIONS

Boers, Arjen, et al., pending U.S. Patent Application entitled "Souce Specific Multicast Group to Source Mapping," U.S. Appl. No. 10/208,977; filed Jul. 31, 2002, including Specification: pp. 1-16; Drawings: Figures 1-3 on 4 sheets.

(Continued)

*Primary Examiner*—Bob A Phunkulh
(74) *Attorney, Agent, or Firm*—Campbell Stephenson LLP

(57) ABSTRACT

A method, apparatus, or computer executable instructions for converting Protocol Independent Mode (PIM) requests. In one embodiment, the method includes receiving a first multicast routing protocol (MRP) message, wherein the first MRP message is a request to join a multicast group of receivers. The first MRP message is translated into a second MRP message, wherein the second MRP message is a request to join the multicast group of receivers to which data is being provided by a specific source. The method could be performed by a router contained in a sparse mode network, wherein the sparse mode network is coupled to a source specific mode network that contains the specific source.

15 Claims, 4 Drawing Sheets

OTHER PUBLICATIONS

Holbrook, Hugh W. and Cheriton, David R., "IP Multicast Channels: Express Support for Large-Scale Single-Source Applications," Computer Communications Review, Association for Computing Machinery, vol. 29, No. 4, Oct. 1999, pp. 65-78.

"Multicast Routing on the Internet," Multicast Communication, Protocols and Applications, May 12, 2000, pp. 105-121.

International Search Report as mailed from the PCT on Nov. 28, 2003, for counterpart WO Application (PCT/US03/23944; Filed Jul. 31, 2003), 7 pages.

S. Deering, "RFC1112—Host Extensions for IP Multicasting," Internet RFC/STD/FYI/BCP Archives, Aug. 1989, pp. 1-13, http://www.faqs.org/rfcs/rfc1112.html.

"Stephen's Multicast Study: Protocol Independent Multicast (PIM)," NIST/ITL Advanced Network Technologies Division Software Distribution, Jun. 14, 1998, pp. 1-8, http://dns.antd.nist.gov/snad-staff/night/multicast/multpim.html.

"Source Specific Multicast (SSM) Homepage," Cisco IOS Software—IP Multicast Development & Dev/Test Groups, Nov. 29, 2000, pp. 1-6, ftp://ftpeng.cisco.com/ipmulticast/ssm/index.html.

H. Holbrook and B. Cain, "Source-Specific Multicast For IP," Internet Engineering Task Force (IETF), Nov. 21, 2001, pp. 1-14, http://www.ietf.org/internet-drafts/draft-ietf-ssm-arch-00.txt.

B. Haberman, "IGMPv3 and Multicast Routing Protocol Interaction," Internet Engineering Task Force (IETF), Feb. 2002, pp. 1-5, http://www.ietf.org/internet-drafts/draft-ietf-magma-igmpv3-and-routing-02.txt.

Supratik Bhattacharyya et al., "An Overview of Source-Specific Multicast (SSM)," Internet Engineering Task Force (IETF), Mar. 4, 2002, pp. 1-13, http://www.ietf.org/internet-drafts/draft-ietf-ssm-overview-03.txt.

"IP Multicast Technology Overview," Cisco Systems, Inc., Apr. 18, 2002, pp. 1-24, http://www.cisco.com/univercd/cc/td/doc/cisintwk/intsolns/mcst_sol/mcst_ovr.htm.

Brad Cain et al., "Internet Group Management Protocol, Version 3," Internet Engineering Taks Force (IETF), May 2002, pp. 1-38.

* cited by examiner

PIM SPARSE MODE TO SOURCE SPECIFIC MULTICAST CONVERSION

BACKGROUND OF THE INVENTION

Internet Protocols (IPs) are employed in networks to transmit data such as audio and video data from a source device (e.g., a server computer system) to one or more receiver devices (e.g., desktop computer systems). Unicast, broadcast, and multicast are three well known techniques for transmitting data between source and receiver devices. Unicast is a point-to-point communication technique in which data is transmitted between only two devices (i.e., one source and one receiver). Broadcast communication enables one source to transmit data to all receivers in a broadcast domain. Multicasting allows a source or several sources to transmit data simultaneously to select receivers, i.e., those receivers in a multicast group. Multicast data or packets are replicated in the network by multicast enabled routers at the point where communication paths diverge to separate receivers. In this fashion, the multicast protocol delivers data to multiple receivers without burdening the source or consuming excessive network bandwidth.

There are several versions of the multicast protocol, including Sparse Mode (SM) and Source Specific Mode (SSM) protocols. FIG. 1 illustrates relevant components of a network 10 that can employ either SM or SSM protocols. More particularly, FIG. 1 shows sources 12a and 12b coupled to receivers 14a-14d via a series of routers 16-16d and communication links 20.

In an SM network, the various multicast enabled routers establish a default multicast distribution tree, referred to as a "shared tree," for each multicast group. Each shared tree is rooted at a rendezvous point (RP) router that acts as the distribution point for multicast data transmitted to receivers of a multicast group. Before a source device can begin transmitting data to receivers of a multicast group, the device must first register with the RP router. Moreover, for a device to join a multicast group as a receiver, the device must join towards the RP router. Once a device joins a multicast group as a receiver, the RP router establishes a communication path between one or more sources and the newly joined receiver.

To further illustrate, presume that router 16a is configured in network 10 as the RP router for a multicast group $G_1$ consisting of receiver devices 14a and 14d. Further, presume that device 14b seeks to join multicast group $G_1$ as a receiver. Device 14b can join the multicast group by first generating a membership report in compliance with Internet Management Group Protocol version 1 (IGMPv1) or Internet Management Group Protocol version 2 (IGMPv2). The identity $G_1$ of the multicast group is included in the membership report along with the identity (e.g., an Internet address) of device 14b. The IGMP membership report is transmitted by device 14b to uplink router 16b via uplink 22a. Uplink router 16b, in response to receiving the IGMP report from device 14b, generates a request to join multicast group $G_1$. In an SM network, this request is designated PIM (*, $G_1$) JOIN, and its sent hop by hop towards the RP router. In SM protocol, the * within the request indicates that the device (e.g., device 14b) seeking to join multicast group $G_1$ should receive data from all sources providing data to the multicast group $G_1$. Thus, if sources 12a and 12b are providing data to receivers within the multicast group $G_1$, device 14b will receive data from both sources 12a and 12b once device 14b joins multicast group $G_1$ as a receiver. For purposes of explanation, it will be presumed that device 12a is the only source providing data to multicast group $G_1$.

The PIM (*, $G_1$) JOIN is transmitted by uplink router 16b to RP router 16a. RP router 16a, in response to receiving PIM (*, $G_1$) JOIN, may establish a communication path between source 12a and itself creating a full path between the source and the receiver through the RP that includes routers 16a, 16b, and 16c. Once this communication path is established, source device 12a transmits data to receivers. Devices 14a, 14c and 14d can similarly join group $G_1$ using the multicast technique described above to also receive data traffic from source 12a. It is noted that the SM protocol may be defined in Internet Engineering Task Force (IETF) Request For Comments (RFC) 2362 entitled "Protocol Independent Multicast—Sparse Mode (PIM-SM): Protocol Specification," published in June 1998, and hereby incorporated by reference in its entirety.

After the communication path is established between source device 12a and receiver device 14b via routers 16a, 16b, and 16c, uplink router 16b may trigger a routine to select a faster and/or more efficient communication path between source device 12a and receiver device 14b that does not include RP router 16a. For example, RP router may establish a new communication path between source device 12a and receiver device 14b that includes only routers 16d and 16b. However, selecting and establishing a more efficient communication path between source 12a and receiver 14b adds some protocol complexity. Once a new and more efficient communication path is established between source device 12a and receiver device 14b, the original communication path is pruned such that only two routers 16d and 16b must be utilized as opposed to three routers 16c, 16a and 16b of the former communication path. This source specific path between 12a and 14b for group $G_1$ is called a source tree and is represented by the notation (S,G), which in this case would result in (12a, $G_1$) and provides the shortest path between the source and the receivers.

As noted above, network 10 may also operate according to SSM protocol. Unlike an SM network, an SSM network does not employ an RP router. In an SSM protocol network, when a device seeks to join a multicast group as a receiver, the device will know in advance the identity of the source from which it seeks to receive data. This enables a new receiver to directly join a multicast group on the shortest path tree towards the source (i.e., without first going through an RP router). Compared to an SM protocol network, an SSM protocol network is more efficient. However, with an SSM network, a receiver device can receive data from only one source (or few sources) within a multicast group. For purposes of explanation, presume that network 10 operates according to SSM protocol, and that devices 14a and 14c are members of a multicast group $G_2$ that receive data from source 12a. Further, presume that device 14b seeks to join multicast group $G_2$ as a new receiver.

Typically, before device 14b can join multicast group $G_2$, device 14b must generate a membership report using IGMP version 3 (IGMPv3) protocol. It is noted that device 14b can join multicast group $G_2$ as a receiver even though device 14b executes only IGMPv1 or IGMPv2 if device 14b and/or router 16b implement the method described in U.S. patent application Ser. No. 10/208,977 entitled "Source Specific Multicast Group to Source Mapping," filed on Jul. 31, 2002. The foregoing patent application is incorporated herein by reference in its entirety. However, for purposes of explanation, it will be presumed that device 14b operates according to IGMPv3 only. The IGMPv3 membership report identifies both the source device 12a and the multicast group that device 14b wishes to join. In contrast, the IGMPv1 or IGMPv2 membership report generated for an SM protocol network device does not identify the source from which data is sought. The IGMPv3 report generated by device 14b is transmitted to uplink router 16b via uplink 22a. Thereafter uplink router 16b establishes a communication path between source device 12a and device 14b via routers 16b and 16d. With this communication path ($12a, G_2$) established, source device 12a transmits data to receiver device 14b via routers 16d and 16b while also transmitting data to the other receivers in multicast group $G_2$.

FIG. 1 presumes that network 10 operates according to either SM protocol or SSM protocol, but not both. FIG. 2 illustrates a network in which both SM and SSM protocols are employed. More particularly, FIG. 2 shows a network 28 consisting of a subnetwork 30 that operates according to SSM protocol, and a subnetwork 32 that operates according to SM protocol. Subnetwork 30 consists of a pair of devices (e.g., computer systems such as servers) 36 that act as source devices. Further, subnetwork 30 includes a pair of multicast enabled routers 44 coupled to source devices 36 via uplink 42. Subnetwork 32 includes devices 40 (e.g., computer systems such as desktops) that can act as receivers. Subnetwork 32 also includes multicast enabled routers 44 coupled to each other via communication links 46 and to devices 40 via uplinks 42a and 42b. Lastly, subnetwork 30 is coupled to subnetwork 32 via communication links 50 and 52. Although FIG. 2 shows direct communication between subnetworks 30 and 32, subnetworks 30 and 32 may be indirectly coupled together. For example, communication link 50 and/or 52 may take form in the Internet operating according to TCP/IP.

As noted, subnetwork 30 operates according to SSM protocol while subnetwork 32 operates according to SM protocol. Because of differences between these multicast protocols, receiver devices 40 within subnetwork 32, executing IGMPv1 or IGMPv2, could not receive multicast data to which devices 36 are sources. It is noted that receiver devices 40 could join a multicast group to which source devices 36 provide data if receiver devices 40 and/or routers 44b and 44e implement the invention described in U.S. patent application Ser. No. 10/208,977. Configuring such devices (e.g., routers 44b and 44e) according to the invention described in U.S. patent application Ser. No. 10/208,977 may require a significant amount of time, cost, and effort, particularly if subnetwork 32 contains several thousand devices that provide connectivity to other receiver devices 40.

SUMMARY OF THE INVENTION

A method, apparatus, or computer executable instructions for converting Protocol Independent Mode (PIM) requests. In one embodiment, the method includes receiving a first multicast routing protocol (MRP) message, wherein the first MRP message is a request to join a multicast group. The first MRP message is translated into a second MRP message, wherein the second MRP message is a request to join the multicast group to which data is being provided by a specific source. The method could be performed by a router contained in a sparse mode (SM) network, wherein the sparse mode network is coupled to a source specific mode (SSM) network that contains the specific source.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DETAILED DESCRIPTION

The present invention provides a method, apparatus, or computer executable instructions which, when executed, enables devices in an SM network to communicate with devices in an SSM network, even when devices in the SM network operate according to IGMPv1 or IGMPv2 protocol only.

Figure 1:
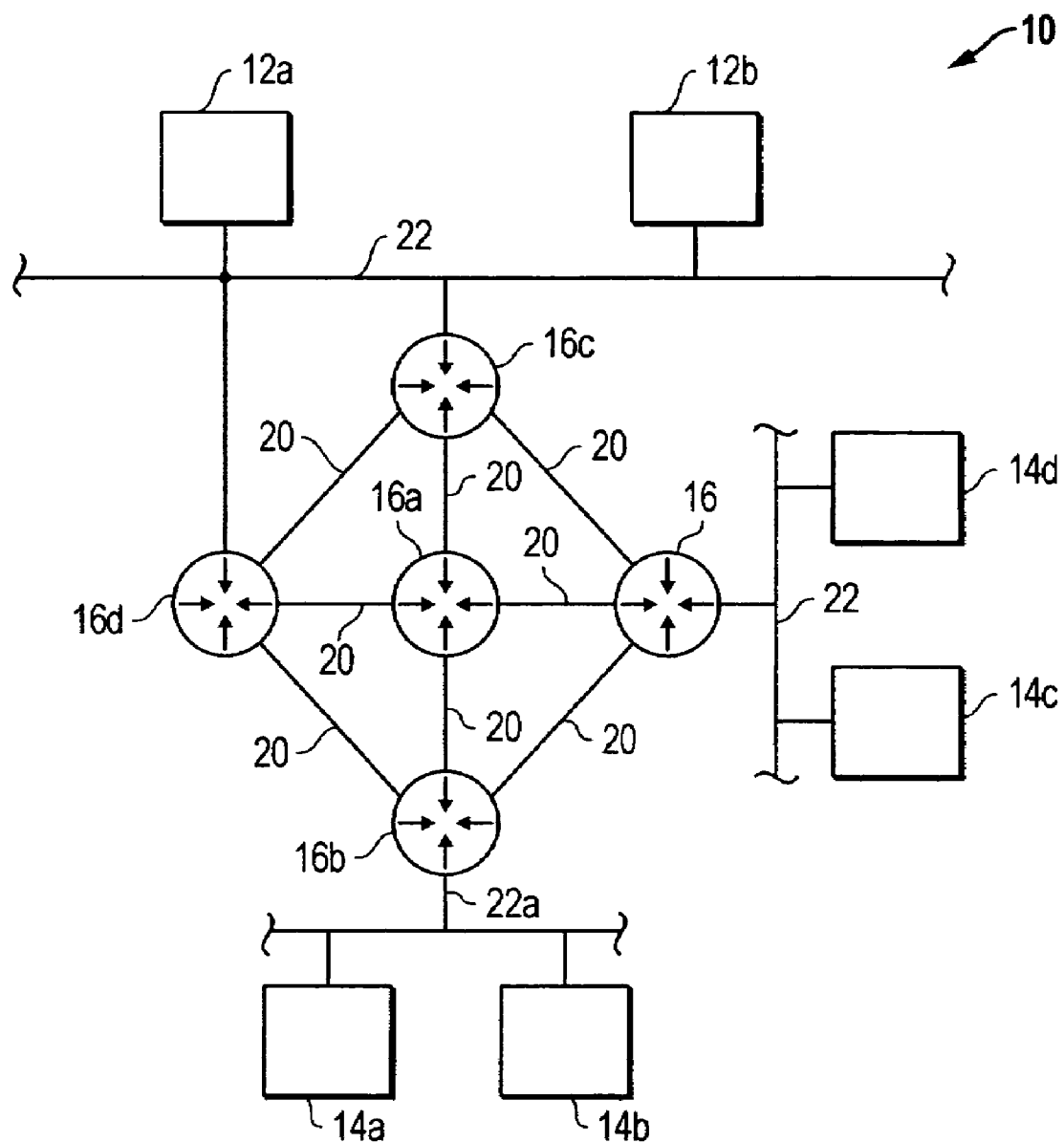
FIG. 1 is a block diagram illustrating relevant components of a network which can employ either SM or SSM protocol.
Figure 2:
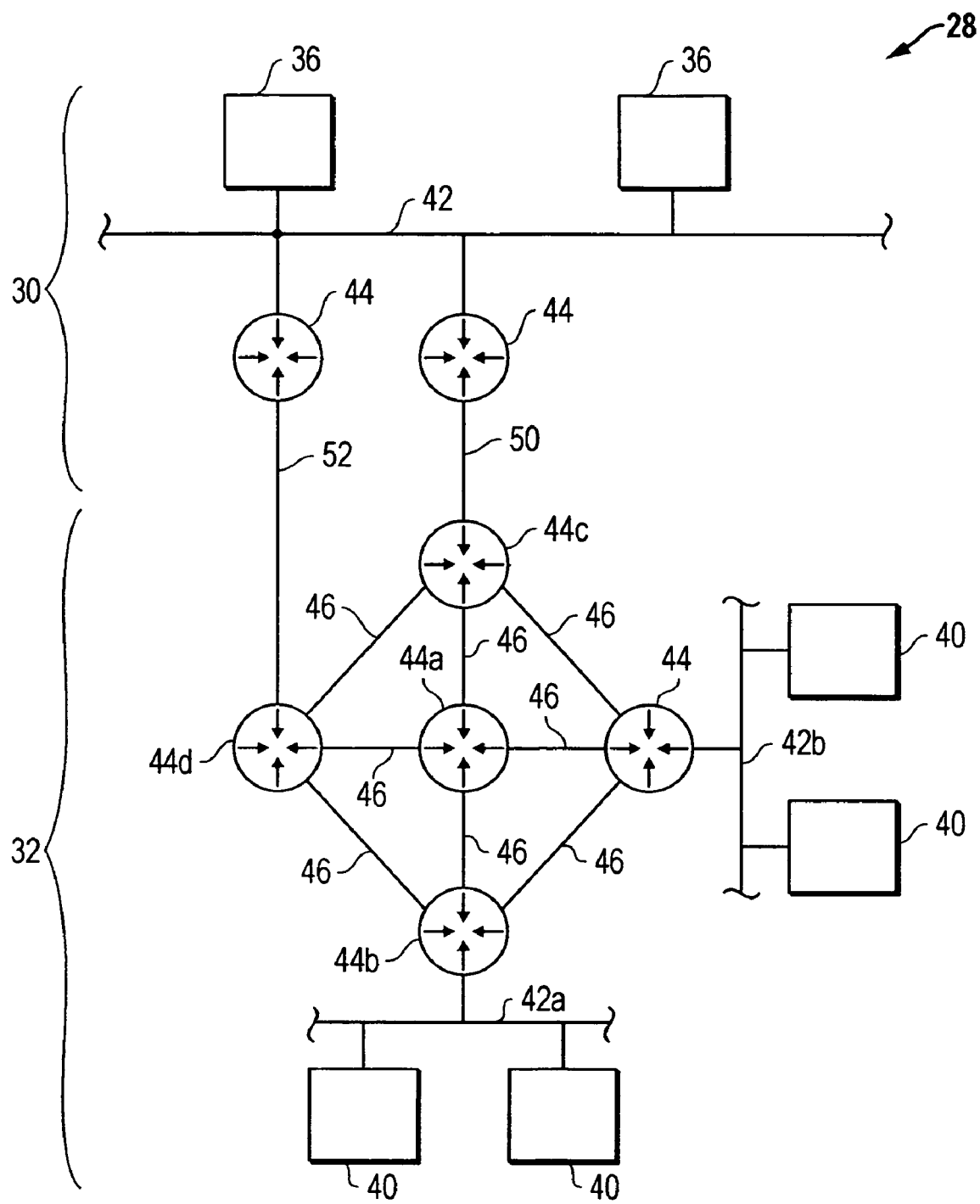
FIG. 2 is a block diagram illustrating relevant components of a network in which both the SM and SSM protocols are employed.
Figure 3:
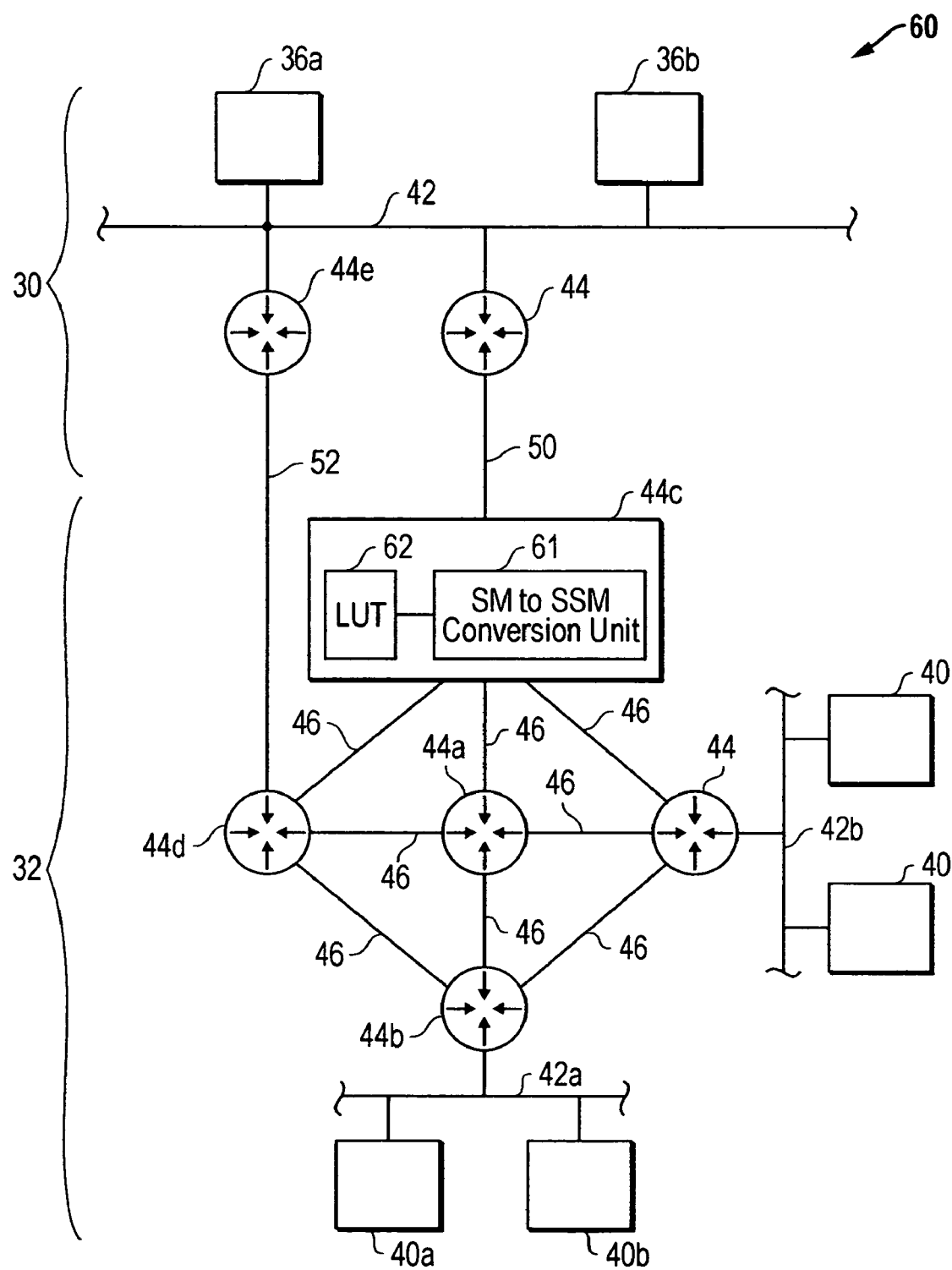
FIG. 3 is a block diagram illustrating relevant components of a network in which the present invention may be employed.

FIG. 3 illustrates a network 60 employing one embodiment of the present invention. It is noted that the invention may be employed in a network different from that illustrated in FIG. 3. The network 60 shown in FIG. 3 is similar to the network 28 shown in FIG. 2. While network 60 is similar to network 28, there are substantial differences. More particularly, router 44c, rather then router 44a, is designated the RP router for SM protocol subnetwork 32. RP router 44c represents an edge router (i.e., a router through which data flows between subnetworks 30 and 32 without having to pass through other routers of subnetwork 32).

RP router 44c is also configured according to one embodiment of the present invention. More particularly, RP router 44c includes SM to SSM conversion unit 61 and lookup table (LUT) 62. While conversion unit 61 can be implemented in hardware (e.g., an application specific integrated circuit), conversion unit 61 will be presumed to be implemented as instructions executing on one or more processors contained within router 44c. Further, as will be more fully described below, LUT 62 includes a plurality of entries, each of which relates a multicast group $G_i$ to the corresponding identity $S_j$ of a device (e.g., one of source devices 36) that provides data to receivers of the multicast group $G_i$.

As will be more fully described below, conversion unit 61 converts an SM request to join a multicast group (PIM ($*, G_i$) JOIN) into an SSM request to join a multicast group (PIM($S_j$, $G_i$) JOIN). Conversion unit 61 thus enables devices 40 of SM subnetwork 32 to join a multicast group to which data is provided by a source device 36 of SSM subnetwork 30 without reconfiguring devices 40 according to the principles set forth in U.S. patent application Ser. No. 10/208,977.

To illustrate, presume that device 40a seeks to join a multicast group $G_3$, and that device 36a (identified as $S_2$) is the source that provides data to receiver devices of multicast group $G_3$. Before receiver device 40a can join multicast group $G_3$, such device 40a, operating according to IGMPv1 or IGMPv2, generates a membership report identifying $G_3$ as the multicast group which device 40a seeks to join as a receiver. It is noted again that the membership report does not include $S_2$, the identity of source device 36a. The membership report is subsequently transmitted to uplink router 44b via uplink 42a. Multicast router 44b receives the membership report from device 40a and, in turn, generates an SM request to join (PIM ($*, G_3$) JOIN) multicast group $G_3$. According to normal SM protocol, PIM ($*, G_3$) JOIN is transmitted to RP router 44c. Note that it is not required that router 44c be the RP for G$_3$. It may be required that all PIM (*,G) JOINS travel through router 44c (having router 44c be the RP for G is one way of accomplishing this).

Figures 4, 5:
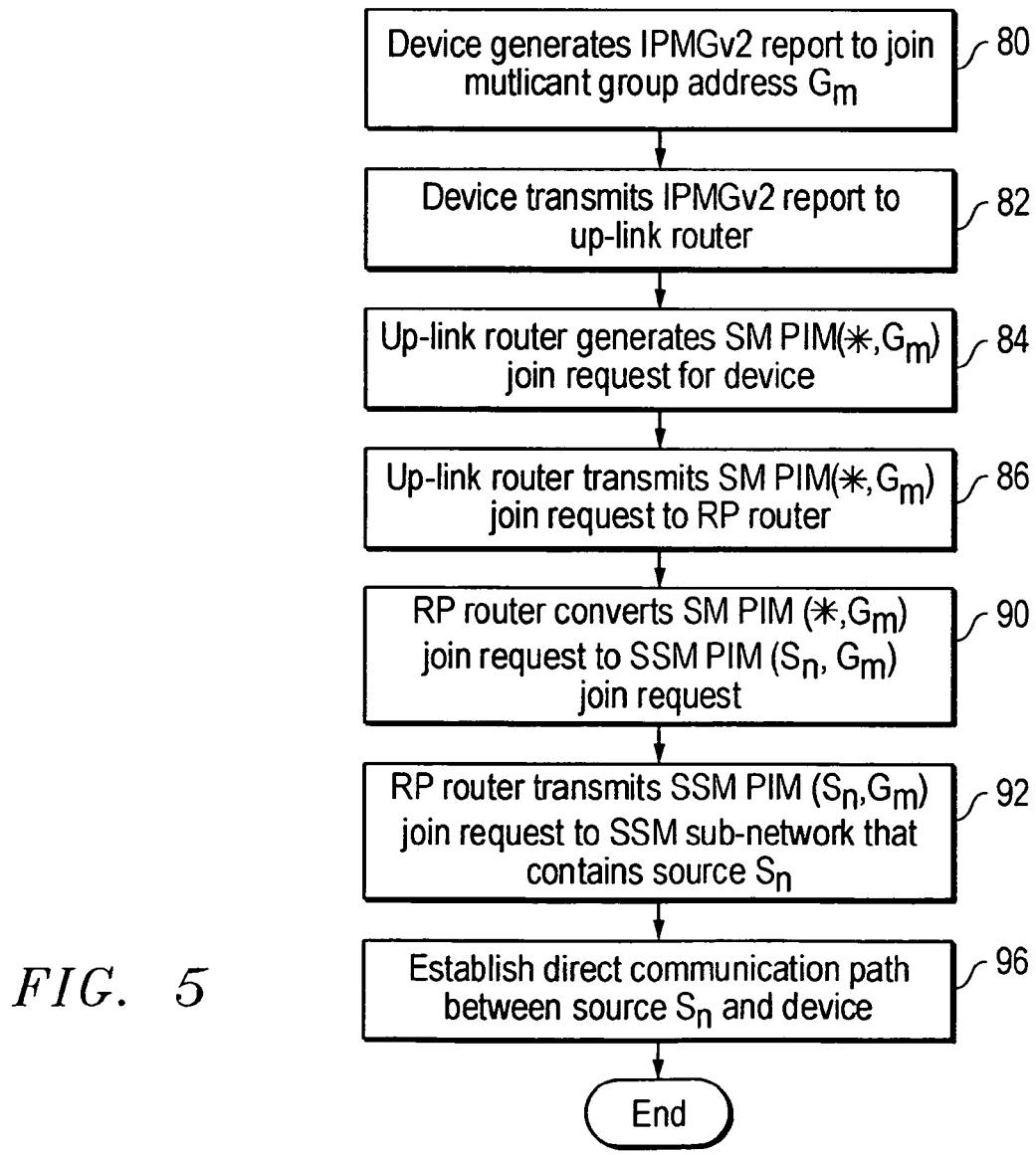
FIG. 4 represents a look-up used in translating SM requests to join a multicast group into SSM requests to join the multicast group and source.
FIG. 5 is a flow chart illustrating operational aspects of translating SM requests to join a multicast group into SSM requests to join the multicast group and source.

Conversion unit 61 receives PIM (*,G$_3$) JOIN, or is otherwise notified that the SM request to join multicast group G$_3$ has been received by RP router 44c. In turn, conversion unit 61 accesses LUT 62 using the multicast group identity G$_3$ of the request. FIG. 4 represents exemplary contents of one embodiment of LUT 62. More particularly, FIG. 4 shows a table 70 having a plurality of entries. Each entry relates particular multicast groups address G$_i$ to a particular source identifier S$_j$. Lookup table 62 returns to conversion unit 61 the identity (e.g., the address of source device 36a) S$_2$ of the source corresponding to multicast group address G$_3$. Conversion unit 61 subsequently generates an SSM request to join PIM (G$_3$,S$_2$) JOIN from PIM (*,G$_3$) JOIN and the result of the lookup in table 62. RP router 44c then transmits PIM (G$_3$,S$_2$) JOIN to subnetwork 30. Thereafter, a communication path is established directly between source device 36a and receiver device 40a that includes multicast router 44d of subnetwork 32 and multicast router 44f of subnetwork 30. It is noted that the direct communication path between source 36a and receiver 40a is established without first establishing a communication path through the RP router 44c. Accordingly, a communication path is established between source 36a and receiver 40a in a time that is shorter than that described with reference to FIG. 2.

FIG. 5 is a flow chart illustrating relevant steps for establishing a communication path between devices in subnetworks operating under different multicast protocols using one embodiment of the present invention. More particularly, the flow chart in FIG. 5 begins when a device within, for example, an SM network generates an IMPGv2 report to join multicast group address G$_m$. Thereafter, in step 82, the device transmits the IMPGv2 report to its uplink router. The uplink router, in turn, generates an PIM(*,G$_m$) request to join. In step 86, the uplink router transmits the PIM(*,G$_m$) request to join to the RP router of the SM protocol network. The RP router in step 90 converts the PIM(*,G$_m$) request to join into an PIM(S$_n$, G$_m$) request to join. The RP router transmits the PIM(S$_n$,G$_m$) request to join to the SSM subnetwork that contains source S$_n$. Lastly, in step 96, a direct communication path is established between source device S$_n$ and the device requesting to join the multicast group G$_m$.

Although the present invention has been described in connection with several embodiments, the invention is not intended to be limited to any specific form set forth herein. On the contrary, it is intended to cover such alternatives, modifications, and equivalents as can be reasonably included within the scope of the invention as defined by the appended claims.

What is claimed is:

1. A method comprising:
   receiving a first multicast routing protocol (MRP) message at a rendezvous point (RP) router, wherein the first MRP message is a request to join a multicast group;
   translating the first MRP message into a second MRP message, wherein the second MRP message is a request to join the multicast group of receivers to which data is being provided by a specific source, and the translating is performed by the rendezvous point (RP) router;
   the RP router transmitting the second MRP message;
   creating a first communication path between the specific source and a receiver after the RP router transmits the second MRP message, wherein the first communication path does not include the RP router; and
   transmitting data from the specific source to the receiver via the first communication path.

2. The method of claim 1 wherein the RP router is contained in a first network that operates according to a first multicast routing protocol, wherein the specific source is contained in a second network that operates according to a second multicast routing operating protocol, and wherein the first and second multicast routing operating protocols are different from each other.

3. The method of claim 1 wherein a first network contains a plurality of routers including the RP router, wherein a second network contains a plurality of routers, and wherein the RP router is positioned within the first network such that data transmitted by the RP router to the second network does not pass through another router of the first network.

4. The method of claim 1 further comprising:
   creating a second communication path between the specific source and the receiver after data is transmitted from the specific source to the receiver via the first communication path, wherein the RP router is not included in the second communication path;
   transmitting more data from the specific source to the receiver via the second communication path.

5. The method of claim 1 wherein translating comprises:
   inputting first data into a look-up table (LUT), wherein the first data comprises an identity of the multicast group of receivers;
   the LUT outputting second data in response to inputting first data, wherein the second data comprises an identity of the specific source.

6. The method of claim 5 wherein the LUT can be stored in memory of the device that translates the first MRP message into the second MRP message or stored in remote memory accessible using a communication protocol.

7. The method of claim 1 wherein the router is contained in a sparse mode (SM) communication network and wherein the second MRP message is configured for subsequent transmission to a source specific mode (SSM) communication network.

8. An apparatus comprising:
   a processor;
   a first memory coupled to the processor, wherein the first memory stores instructions executable by the processor;
   wherein the processor implements a method in response to executing the instructions, the method comprising:
      translating a first MRP message which has been received by a rendezvous point (RP) router into a second MRP message, wherein
         the first MRP message is a request to join a multicast group of receivers,
         the second MRP message is a request to join the multicast group of receivers to which data is being provided by a specific source, and
         the translating is performed by the RP router,
      transmitting the second MRP message, wherein the transmitting is performed by the RP router;
   a first circuit which creates a first communication path between the specific source and a receiver after the RP router transmits the second MRP message, wherein the first communication path does not include the RP router; and
   a second circuit which transmits data from the specific source to the receiver via the first communication path.

9. An apparatus comprising:
   means for receiving a first multicast routing protocol (MRP) message by a rendezvous point (RP) router, wherein the first MRP message is a request to join a multicast group of receivers;

means for translating the first MRP message into a second MRP message, wherein
the second MRP message is a request to join the multicast group of receivers to which data is being provided by a specific source, and the translating is done by the RP router;

means for creating a first communication path between the specific source and a receiver after the RP router transmits the second MRP message, wherein the first communication path does not include the RP router; and means for transmitting data from the specific source to the receiver via the first communication path.

10. Computer readable storage media storing instructions, wherein method is performed in response to executing the instructions, the method comprising:
a rendezvous point (RP) router translating a first MRP message into a second MRP message, wherein the first MRP message is a request to join a multicast group of receivers, and wherein the second MRP message is a request to join the multicast group of receivers to which data is being provided by a specific source;
the RP router transmitting the second MRP message;
creating a first communication path between the specific source and a receiver after the RP router transmits the second MRP message, wherein the first communication path does not include the RP router;
transmitting data from the specific source to the receiver via the first communication path.

11. The computer readable storage media of claim 10 wherein the RP router is contained in a first network that operates according to a first multicast routing protocol, wherein the specific source is contained in a second network that operates according to a second multicast routing operating protocol, and wherein multicast routing operating protocol, and wherein the first and second multicast routing operating protocols are different from each other.

12. The computer readable storage media of claim 10 wherein a first network contains a plurality of routers including the RP router, wherein a second network contains a plurality of routers, and wherein the RP router is positioned within the first network such that data transmitted by RP router to the second network does not pass through another router of the first network.

13. The computer readable storage media of claim 10 wherein the method further comprises: creating a second communication path between the specific source and the receiver after data is transmitted from the specific source to the receiver via the first communication path, wherein the RP router is not included in the second communication path; transmitting more data from the specific source to the receiver via the second communication path.

14. The computer readable storage media of claim 10 wherein translating comprises: inputting first data into a look-up table (LUT), wherein the first data comprises an identity of the multicast group of receivers; the LUT outputting second data in response to inputting first data, wherein the second data comprises an identity of the specific source.

15. The computer readable storage media of claim 10 wherein the router is contained in a sparse mode (SM) communication network and wherein the second MRP message is configured for subsequent transmission to a source specific mode (SSM) communication network.

* * * * *

UNITED STATES PATENT AND TRADEMARK OFFICE
CERTIFICATE OF CORRECTION

PATENT NO.      : 7,418,003 B1  
APPLICATION NO. : 10/777601  
DATED           : August 26, 2008  
INVENTOR(S)     : Daniel Alvarez et al.

Page 1 of 1

It is certified that error appears in the above-identified patent and that said Letters Patent is hereby corrected as shown below:

Title page, item (73) Assignee: should read as follows: Cisco Technology, Inc., San Jose, CA (US)

Signed and Sealed this

Seventh Day of October, 2008

JON W. DUDAS  
*Director of the United States Patent and Trademark Office*